UNITED STATES PATENT OFFICE.

J. P. FERTIG, OF ST. LOUIS, MISSOURI, ASSIGNOR TO HIMSELF AND J. C. SALZGEBER, OF SAME PLACE.

IMPROVED ANTI-TYPHUS REMEDY.

Specification forming part of Letters Patent No. 39,861, dated September 8, 1863.

*To all whom it may concern:*

Be it known that I, J. P. FERTIG, of the city and county of St. Louis and State of Missouri, have discovered and produced a new and useful composition of matter, and which I denominate "Anti-Typhus Remedy;" and I do hereby declare that the following is a full and clear description of the mode of compounding and using the same.

The proximate cause of all contagious fevers is the action upon and within the human system of a foreign matter which is liable to produce the same disease in every individual, and which generates active principles similar to its own within the human body through the diseased organism of the same, or which may be reproduced in the atmosphere from animal or vegetable decomposition. In the former instance it is called "contagious" and in the latter "miasmatic."

The object of my invention or discovery is to render the human system incapable of being acted upon by or giving existence to contagious materies, and to oppose the process of the self-reproduction and manifold self-generation of the active principles in which exist the causes of contagious fevers; and the nature of this invention or discovery relates to a certain combination of ingredients by means of which may be produced a most excellent prophylactic and remedy against all contagious fevers, including the *Typhus ictorodes* or yellow fever.

The said remedy will be compounded and prepared as follow: *Julep e. camphora*, two ounces; *Acidum muriaticum*, two ounces; *Aether aceticus*, two drams. The mass should be well shaken, so as to mix the ingredients thoroughly together, and it is then ready for use. The preparation called *Julep e. camphora* is prepared as follows: To one dram of gum-camphor dissolved in a few drops of alcohol add one-half an ounce of pulverized white sugar and mix them well together in a mortar or other suitable vessel. Then add ten ounces warm distilled water. When the mass is cold filter it through paper, and the preparation will be ready for use.

In order to secure the best results from the medicine above described, it is advised that the patient or person using the same shall first take a mild cathartic, and after the evacuation resulting therefrom the aforesaid remedy may be taken as follows: If taken as a prophylactic, one tea-spoonful in one-half pint of sweetened water four times a day, and as a remedy in case of paroxysms, a tea-spoonful in sweetened tea of arnica-flowers every two hours.

I do not wish to be understood as claiming the discovery, production, or employment of the aforesaid ingredients as taken separately and singly, as I am aware that the same have been known and employed in that manner in the treatment of fevers to some extent; but, Having described my invention or discovery sufficiently to enable persons skilled in the art to compound and use the same, what I do claim as new of my own discovery, and desire to secure by Letters Patent, is—

The within-described composition of matter or remedy compounded of the ingredients mentioned, in the quantities and proportions named, as a new article of manufacture and trade, for the purposes set forth.

In testimony whereof I have hereunto set my hand and seal this 1st day of June, 1863.

J. P. FERTIG. [L. S.]

Witnesses:
H. E. CLIFTON,
E. A. SKULE.